July 10, 1956 D. J. ENRIGHT 2,754,374
APPARATUS FOR ZERO-SETTING DIRECT-CURRENT AMPLIFIERS
Filed Oct. 14, 1952
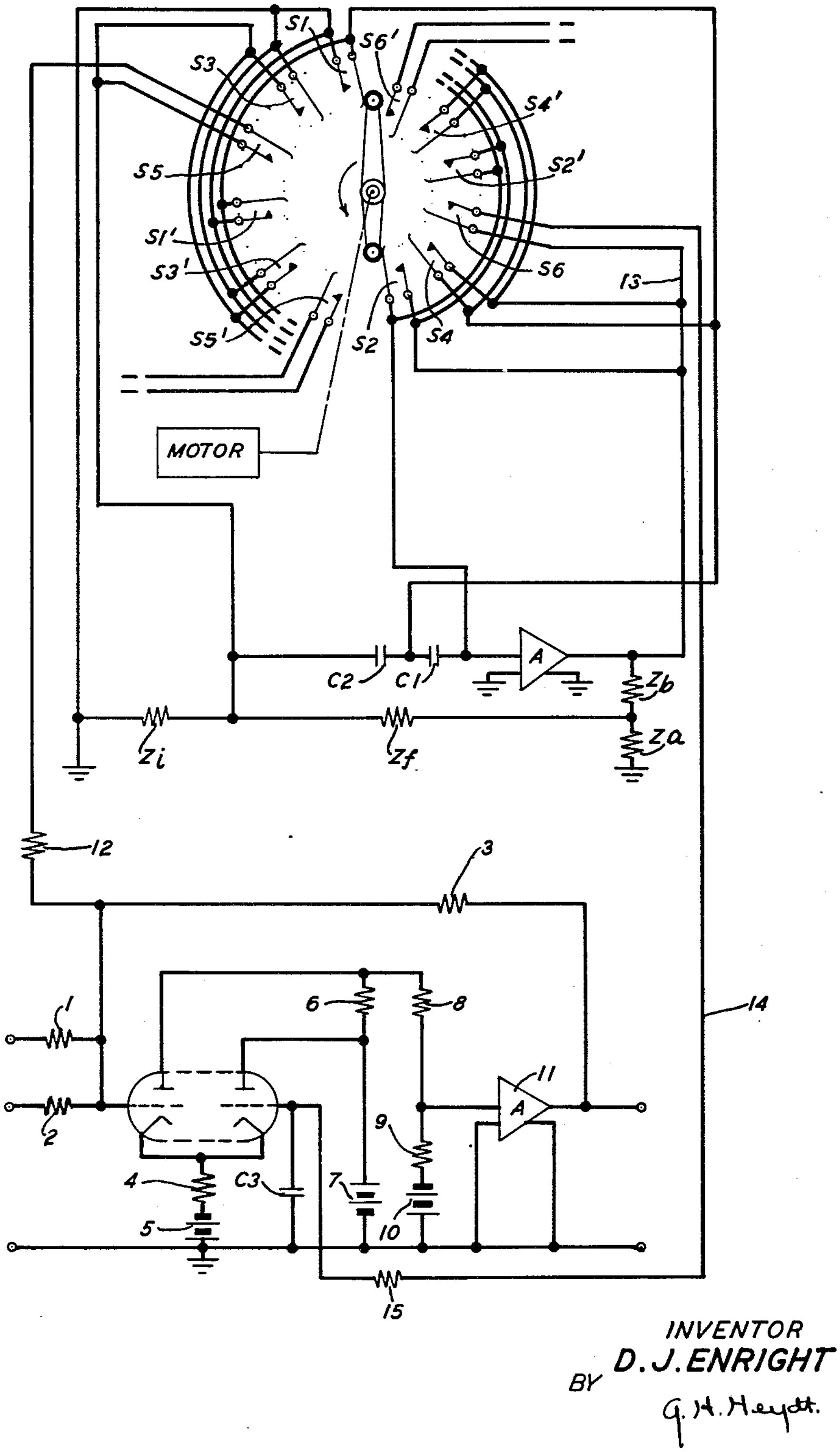
INVENTOR
D. J. ENRIGHT
BY G. H. Heydt.
ATTORNEY United States Patent Office 2,754,374

Patented July 10, 1956

2,754,374

APPARATUS FOR ZERO-SETTING DIRECT-CURRENT AMPLIFIERS

Donald J. Enright, Morristown, N. J., assignor to Bell Telephone Laboratories, Incorporated, New York, N. Y., a corporation of New York Application October 14, 1952, Serial No. 314,679

2 Claims. (Cl. 179—171)

This invention relates to apparatus for zero-setting direct-current, or low frequency amplifiers.

The object of the invention is a system which compensates for undesired drift and offset voltages in the output circuit of a direct current, or low frequency amplifier.

A feature of the invention is a plurality of capacitors connected in serial relationship to the input circuit of the amplifier.

Another feature of the invention is a switching mechanism for successively connecting the output circuit of the amplifier to the input capacitors.

In many analog computers, and test equipments, direct-current, or low frequency, amplifiers are used in association with electrical networks comprising one or more, input impedances and a feedback impedance connected in serial relationship to the load impedance. The function of the amplifier is to supply a current to the feedback impedance which will reduce the net resultant potential of the null point, that is, the junction of the input and feedback impedances, to a small value, and to supply the load current to the load impedance. When voltages representing mathematical quantities are supplied to the input impedances of such a network, the network may be designed to add, substract, multiply, divide, differentiate, or integrate the mathematical quantities; and, will usually reverse the polarity of the resultant input voltage.

For minimum error in the function of such networks, the net resultant potential at the null point must be zero; and any deviation from zero of this potential is a deviation from perfection in the function of the network. When using a direct-current, or low frequency amplifier in association with such a network, the potential at the null point is affected by noise voltages in the system, offset voltages due to contact differences of potential in the elements of the amplifier, and a tendency of the output voltage of the amplifier to drift from its value at any instant.

In accordance with the present invention, a plurality of capacitors are connected in serial relationship to the input circuit of a direct-current, or low frequency amplifier, and are successively charged by the output voltage of the amplifier to potential differences which compensate for the noise, offset and drift voltages. The amplifier may be used alone, or in association with a feedback network.

The single figure of the drawings shows the invention embodied in a direct-current amplifier system, which may be used as a switched amplifier to zero set one or more direct-current amplifiers.

The switches S1, S2, S3, S4, S5, S6, may conveniently be of a known type in which the inner contact springs are disposed around the circumference of a circle, the outer contact springs are correspondingly disposed round the circumference of a concentric circle, and an arm, having insulating rollers mounted on each extremity, is rotated about the center of the circles, to recurrently and successively operate the diametrically opposite pairs of contacts. Such switches may have fifty or more pairs of contacts.

In the condition shown in the drawings, the input impedance $Zi$ is grounded, thus, no signal voltages are supplied to the input circuit of amplifier A. The amplifier A may be any suitable high gain polarity reversing, direct-current, or low frequency, amplifier. The closure of switch S1 grounds one plate of capacitor C1, and the simultaneous closure of switch S2 supplies the output current of amplifier A to charge capacitor C1. The subsequent openings of switches S1, S2, and the closure of switch S3 grounds one plate of capacitor C2, and the simultaneous closure of switch S4 supplies the output current from amplifier A to charge capacitor C2.

The output voltage of amplifier A is divided by impedances $Za$, $Zb$, and supplied through the feedback impedance $Zf$ to one plate of capacitor C2. If desired, the potential dividing impedances $Za$, $Zb$, may be omitted, and the feedback impedance $Zf$ connected directly to the output circuit of amplifier A.

Let $e_g$ be the potential of the junction of $Zi$ and $Zf$, and $e_0$ to be the potential of the junction of $Zo$ and $Zb$, then $$e_g=\beta e_0$$

where $$\beta \doteq \frac{Za}{(Za+Zb)}\,\frac{Zi}{(Zi+Zb)} \qquad (1)$$

Assume that the amplifier has a gain of $-\mu$ and that an undesired voltage $\epsilon_i$ is effective in its input circuit. If there were no feedback this voltage would produce an output voltage $\epsilon_0=-\mu\epsilon_i$. However, with a feedback factor $\beta$, $$e_0=-\mu e_g-\mu\epsilon_i=-\mu\beta e_0-\mu\epsilon_i$$

$$e_0(1+\mu\beta)=-\mu\epsilon_i$$

$$e_0=\frac{\epsilon_0}{1+\mu\beta}$$

Thus feedback has reduced the undesired output voltage $\epsilon_0$ in the ratio $$\frac{1}{1+\mu\beta}$$

When switches S1, S2, are closed, the output voltage of amplifier A will change to a new value $e_0'$; and this voltage will charge capacitor C1 to a potential difference $e_c=e_0'$. The input voltage of amplifier A will then be $e_c+\epsilon_i$.

Then $$e_c=e_0'=-\mu(e_c+\epsilon_i)=-\mu e_c-\mu\epsilon_i$$

hence $$e_c=\frac{-\mu\epsilon_i}{1+\mu}$$

and $$-\mu e_c=\frac{\mu^2\epsilon_i}{1+\mu}$$

When switches S1, S2, are reopened, the output voltage of amplifier A will change to a new value $e_0''$, and this will produce a voltage $e_g''=\beta e_0''$ at the junction of $Zi$ and $Zf$.

Then, $$e_0''=-\mu(\beta e_0''+e_c+\epsilon_i)$$

$$=-\mu\beta e_0''+\frac{\mu^2\epsilon_i}{1+\mu}-\mu\epsilon_i$$

$$e_0''(1+\mu\beta)=-\mu\epsilon_i\left(1-\frac{\mu}{1+\mu}\right)=-\mu\epsilon_i\left(\frac{1}{1+\mu}\right)$$

$$e_0''=\frac{\epsilon_0}{1+\mu\beta}\left(\frac{1}{1+\mu}\right)$$

The undesired output voltage $\epsilon_0$ has been reduced in the ratio $$\frac{1}{1+\mu\beta}$$

by the negative feedback, and further reduced in the ratio $$\frac{1}{1+\mu}$$

by the charge on capacitor C1.

When switches S3, S4, are closed, the output voltage of amplifier A will change to a value $e_0'''$, and this voltage will charge capacitor C2 to a potential difference $e_c'=e_0'''$. Thus, $$e_0'''=-\mu(e_c'+e_c+\epsilon_i)$$

$$e_c'=-\mu e_c'+\frac{\mu^2\epsilon_i}{1+\mu}-\mu\epsilon_i$$

$$e_c'(1+\mu)=-\mu\epsilon_i\left(1-\frac{\mu}{1+\mu}\right)=-\mu\epsilon_i\left(\frac{1}{1+\mu}\right)$$

$$e_c'=-\mu\epsilon_i\left(\frac{1}{1+\mu}\right)^2$$

When switches S3, S4, are reopened, the output voltage of amplifier A will change to a value $e_0''''$, and this voltage will produce a voltage $e_g'''=\beta e_0''''$ at the junction of $Zi$ and $Zf$.

$$e_0''''=-\mu(e_g'''+e_c'+e_c+\epsilon_i)$$

$$=-\mu\beta e_0''''+\mu^2\epsilon_i\left(\frac{1}{1+\mu}\right)^2+\mu^2\epsilon_i\left(\frac{1}{1+\mu}\right)-\mu\epsilon_i$$

$$e_0''''(1+\mu\beta)=-\mu\epsilon_i\left(1-\frac{\mu}{(1+\mu)^2}-\frac{\mu}{1+\mu}\right)$$

$$=-\mu\epsilon_i\left(\frac{1}{(1+\mu)^2}\right)$$

$$e''''=\frac{-\mu\epsilon_i}{(1+\mu\beta)(1+\mu)^2}=\frac{\epsilon_0}{(1+\mu\beta)(1+\mu)^2}$$

Each step has reduced the remaining error voltage by the factor $$\frac{1}{1+\mu}$$

Likewise, for N steps, employing N series capacitors, the total reduction in $\epsilon_0$ is $$\frac{1}{(1+\mu)^N}$$

The error voltage of amplifier A having been reduced to a very small value, the amplifier may be used for any purpose which requires an accurate direct-current amplifier, such as the reduction of the zero errors of the summing amplifiers used in analog computers. A modern analog computer may include a score, or more of direct-current summing amplifiers, and the accuracy of the results obtained from these amplifiers will also be affected by noise, offset, and drift voltages. A typical summing amplifier is shown in the lower part of the drawing, and includes one, or more, input impedances 1, 2, which may be connected to sources of voltages representing mathematical quantities involved in the computations, a feedback impedance 3, and an amplifier connected from the junction of the input and feedback impedances to the free end of the feedback impedance and the load.

The first stage of such an amplifier may include a twin triode vacuum tube, having a common cathode resistor 4 connected to a source of negative voltage 5. The control grid of the left triode is connected to the null point at the junction of impedances 1, 2, 3; the anode of this triode is connected through resistor 6 to a source of positive voltage 7, and through resistors 8, 9, to a source of negative voltage 10. The junction of resistors 8, 9, is connected to the input circuit of two further stages of amplification, symbolically represented by the triangle 11. The control grid of the right triode is connected to ground through capacitor C3, and the anode of this triode is connected to the source 7.

Normally, the summing amplifier will maintain the potential of the junction of impedances 1, 2, 3, at a small value, but undesired voltages may disturb this relationship. When switches S5, S6, are closed, the potential of the junction of impedances 1, 2, 3, is applied through resistor 12, and switch S5 to the input circuit of amplifier A. The resultant output voltage of amplifier A causes a current to flow through connection 13, switch S6, connection 14, resistor 15, to charge capacitor C3, thus changing the potential of the signal grid of the right triode to vary the current in the common cathode resistor 4, which changes the output voltage of the summing amplifier to compensate for the effect of the undesired voltages. By using a number of switches, corresponding to switches S5, S6, the amplifier A can successively and recurrently set to zero the resultant input potentials of a number of summing amplifiers. It is to be noted that the conductors leading to switch S1 are multipled to switch S1′ and that the conductors leading to switch S2 are multipled to switch S2′. Similar multiple connections link switches S3 and S3′ and S4 and S4′. However, switches S5 and S6 are individual to the summing amplifier shown in the lower part of the drawing, whereas switches S5′ and S6′ extend to a different but identical summing amplifier. It is believed to be obvious, in view of the generalized description of the equipment which appears earlier in the specification that, if $n$ summing amplifiers are to be adjusted, it will be necessary to provide $n$ sets of switches S1, S2, S3, S4, S5 and S6, of which switches S1, S2, S3, and S4, respectively, will appear as recurring multiple connections.

What is claimed is:

1. In combination with a direct-current amplifier having grounded input and output circuits, a first and a second capacitor connected in serial relationship to said input circuit, a grounded input resistor connected to the free terminal of said first capacitor, a feedback resistor connected from said output circuit to said input resistor, and switching means for connecting said output circuit in succession to the terminals of said capacitors nearest the amplifier, and for simultaneously connecting ground in succession to the other terminals of said capacitors, whereby the effect on said output circuit of undesired voltages existing in said amplifier is reduced to a small value.

2. In a system including a plurality of direct-current summing networks, each network including an input resistor and a compensating capacitor, the improvement which comprises a first plurality of switches adapted for consecutive operation, each switch having a common contact and a contact respectively connected to the input resistor of one of the networks, a corresponding second plurality of switches, each switch having a common contact and a contact respectively connected to the compensating capacitor of the network, a direct-current amplifier having grounded input and output circuits, a first and a second capacitor connected in serial relationship to said input circuit, a grounded resistor connected to the free terminal of the second capacitor and the common contacts of the first plurality of switches, a second resistor connected from the output circuit of the amplifier to the free terminal of the second capacitor, a third switch having a contact connected to the junction of said capacitors and a grounded contact, a fourth switch having contacts respectively connected to said input and output circuits, a fifth switch having a contact connected to the free terminal of the second capacitor and a grounded contact, and a sixth switch having a contact connected to the junction of said capacitors and a contact connected to said output circuit and to the common contacts of the second plurality of switches, whereby the operation of switches three and four will reduce the zero error of the amplifier, the subsequent operation of switches five and six will further reduce the zero error of the amplifier, and the subsequent operations of the plurality of switches will consecutively connect the networks to the amplifier to reduce the zero errors of the networks.

References Cited in the file of this patent

UNITED STATES PATENTS

| | | |
|---|---|---|
| 2,229,702 | Larsen | Jan. 28, 1941 |
| 2,436,891 | Higinbatham | Mar. 2, 1948 |
| 2,607,528 | McWhirter et al. | Aug. 19, 1952 |